(12) United States Patent
Sundström

(10) Patent No.: US 6,974,030 B1
(45) Date of Patent: Dec. 13, 2005

(54) MAGAZINE FOR SCREWS

(76) Inventor: Fred Sundström, Rind 2466, S-840 50 Gällö (SE)

( * ) Notice: Subject to any disclaimer, the term of this patent is extended or adjusted under 35 U.S.C. 154(b) by 238 days.

(21) Appl. No.: 10/031,370

(22) PCT Filed: Jul. 10, 2000

(86) PCT No.: PCT/SE00/01463

§ 371 (c)(1),
(2), (4) Date: May 10, 2002

(87) PCT Pub. No.: WO01/09526

PCT Pub. Date: Feb. 8, 2001

(30) Foreign Application Priority Data

Jul. 21, 1999 (SE) ..................... 9902749

(51) Int. Cl.⁷ ............................................. B65D 85/24
(52) U.S. Cl. ..................... 206/347; 206/344
(58) Field of Search ................ 206/347, 344, 206/338, 339–343, 345, 346, 820, 3; 227/120; 411/443

(56) References Cited

U.S. PATENT DOCUMENTS

| | | | | |
|---|---|---|---|---|
| 212,642 A | * | 2/1879 | Allen | 206/338 |
| 377,804 A | * | 2/1888 | Grant | 206/344 |
| 383,907 A | * | 6/1888 | Prouty | 206/344 |
| 383,908 A | * | 6/1888 | Prouty | 206/344 |
| 569,886 A | * | 10/1896 | Raymond | 206/347 |
| 1,337,212 A | * | 4/1920 | Elliott | 206/347 |
| 1,955,833 A | * | 4/1934 | Romanoff | 428/119 |
| 3,578,152 A | * | 5/1971 | Hartley | 206/3 |
| 3,812,961 A | * | 5/1974 | Merrick et al. | 206/338 |
| 4,047,611 A | * | 9/1977 | Damratowski | 206/347 |
| 4,298,121 A | | 11/1981 | Oide et al. | |
| 4,586,607 A | * | 5/1986 | Dubbs et al. | 206/716 |
| 4,681,222 A | * | 7/1987 | Longhenry | 206/347 |
| 5,811,717 A | * | 9/1998 | Day et al. | 89/35.01 |

FOREIGN PATENT DOCUMENTS

| | | | |
|---|---|---|---|
| GB | 2147873 | | 5/1985 |
| GB | 2147873 A | * | 5/1985 |
| WO | WO 90/13493 | * | 11/1990 |

* cited by examiner

Primary Examiner—Mickey Yu
Assistant Examiner—J. Gregory Pickett
(74) Attorney, Agent, or Firm—Young & Thompson

(57) ABSTRACT

A screw magazine includes a form-stiff framework (1) having a front side (4) and a back side (5) between which a plurality of mutually spaced-apart bores (10) extend, each one of which is delimited by an endless limiting wall (11) of a resilient, demolishable nature and of which at least some house screws (12) located at a distance from each other. The length of the individual screw (12) is smaller than the depth of the framework (1) counted as the distance between the front and back sides (4, 5), a free tip of the individual screw being located at a certain distance inside the back side of the framework, at the same time as an end surface on the head of the individual screw (12) is situated in flush with the front side (4) of the framework.

5 Claims, 2 Drawing Sheets

MAGAZINE FOR SCREWS

TECHNICAL FIELD OF THE INVENTION

Figure 1:
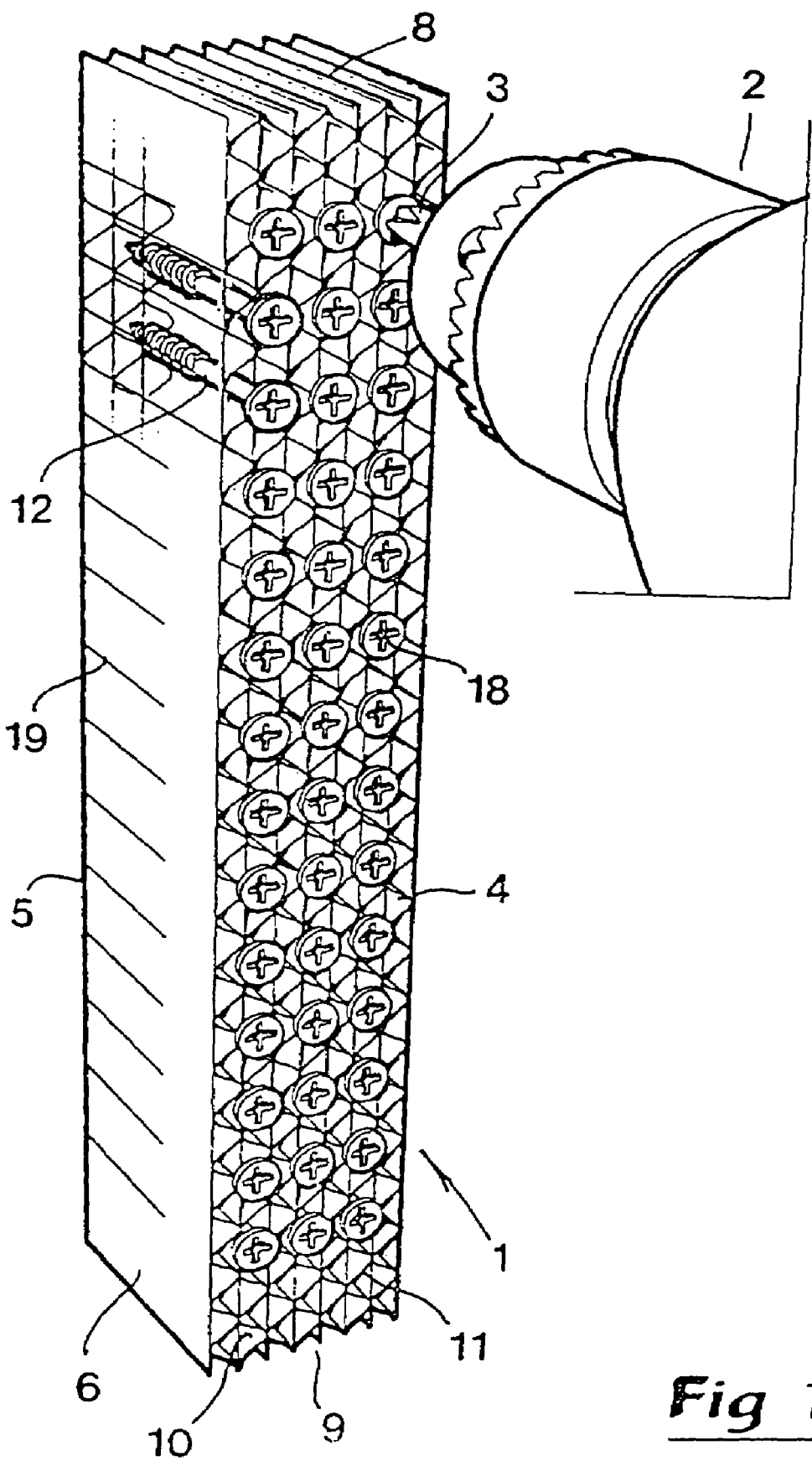

This invention relates to a magazine for screws of the type that includes a shank with a thread and a head at one end of the shank, including a form-stiff framework with a front side and a back side, between which a plurality of mutually spaced-apart bores extend, which individually are delimited by an endless limiting wall of a resilient, demolishable nature, and of which at least certain house screws located at a distance from each other.

BACKGROUND OF THE INVENTION

In industries and crafts as well as for domestic use, self-drilling screws for general fastening purposes are used in an increasing extension. Such screws include a specially designed tip in combination with a thin, sharp thread which entails that the screw may be fastened in existing work pieces without pre-drilled holes. The driving of the screws usually takes place by means of a drilling screwdriver, the rotatable tool (commonly denominated "bit") of which is applied in a most often cruciform seat in the head of the screw. Like conventional, non-self-drilling screws, screws of this type are usually stored higgledy-piggledy in capsules or storage boxes, e.g. of cardboard. This means that the screws have to be picked up one by one, either directly out of the storage box or possibly out of a pocket on the user's clothing so as to be individually applied by hand on the rotatable tool of the drilling screw driver. This tool may be magnetized per se in order to facilitate application and retention of the screws. Nevertheless, such manual application of the individual screws is a troublesome and delaying work. A special problem is inherent in self-drilling screws inasmuch as the user has to hold and guide the screw so that it is drawn into the work piece in the desired, usually perpendicular direction to the surface of the work piece without the aid of a pre-drilled hole. Rather frequently, it therefore happens that the screw sways when the driving operation should be initiated. This is something which additionally delays and makes the work in question more difficult.

A screw magazine of the initially generally mentioned kind is previously known by AT 378045. In this case, the screw magazine is tape-shaped and intended to co-operate with a feeding device belonging to a drilling machine or a drilling screwdriver, which feeding device includes two position-determining fences. These fences have the purpose of, at axial feed of the screw-carrying tape, providing for that the individual screw in the drawing in position thereof is oriented perpendicularly to the material, the magazine tape having the purpose of guiding the screws laterally. For this purpose, the screws in the known magazine are considerably longer than the depth of the magazine tape, the individual screw protruding from the front side as well as the back side of the magazine tape. In other words, the use of such screw magazines is limited to only such drilling screwdrivers including a feeding device for the feed of the screw-carrying tape.

OBJECTS AND FEATURES OF THE INVENTION

The present invention aims at obviating the abovementioned shortcoming of the previously known screw magazine and at providing an improved screw magazine. Therefore, a primary object of the invention is to provide a screw magazine which may be handled manually in the sense that the same does not need to co-operate with particular feeding devices, at which the magazine should be able to be stored in a structured way, for instance in articles of clothing, and if required taken out by the user to directly be applied against the material in which a screw is to be fastened. Another object is to provide a structurally simple magazine, which may be manufactured at low cost.

BRIEF DESCRIPTION OF THE APPENDED DRAWINGS IN THE DRAWINGS

Figure 2:
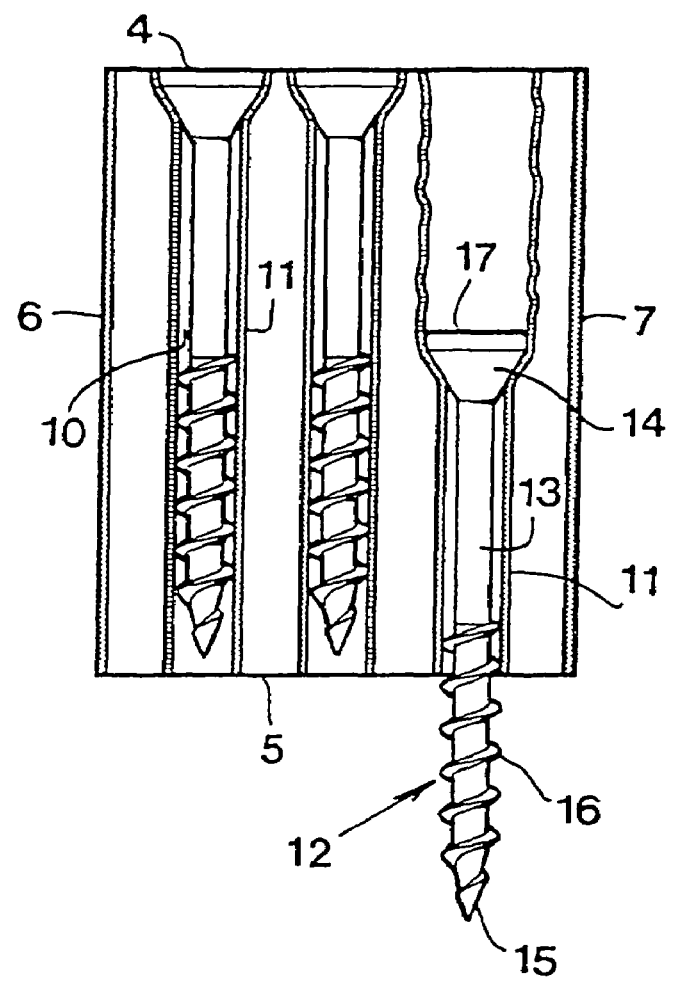
Figure 3:
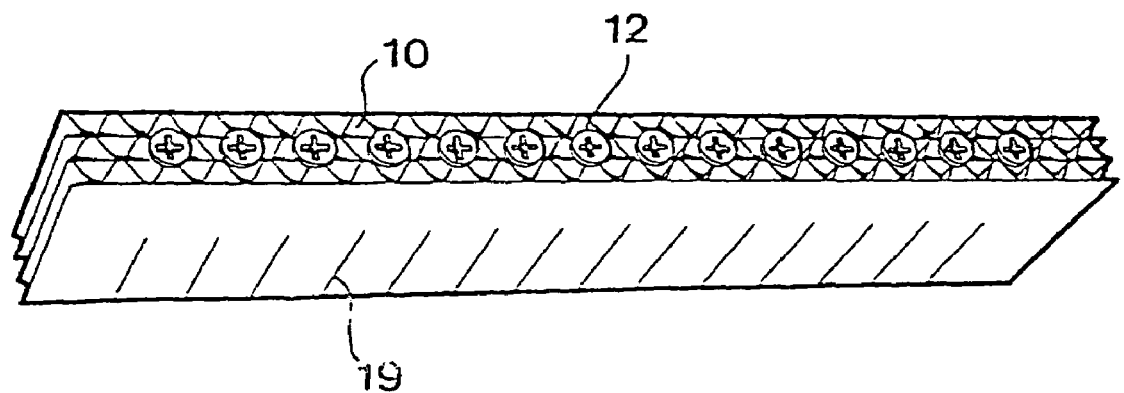

FIG. 1 is a perspective view of a screw-housing magazine according to the invention, the magazine being visualised together with parts of a conventional drilling screw driver, FIG. 2 is an enlarged cross-section through the screw magazine according to FIG. 1, and FIG. 3 is a perspective view showing an alternative embodiment of the magazine.

DETAILED DESCRIPTION OF PREFERRED EMBODIMENTS OF THE INVENTION

In FIGS. 1 and 2, which illustrate a first embodiment of the invention, 1 generally designates a magazine, while 2 designates a partially outlined drilling screw driver or drilling machine. In this machine, a so-called bit 3 constituting a replaceable, rotatable tool by means of which screws may be set in rotation, is included.

The magazine 1 consists of a framework, which in the example has a parallelepipedical basic shape. Thus, the framework has a plane front side 4, which is parallel to an opposite, plane back side 5. In addition, the framework has two opposite, plane and parallel long side surfaces 6, 7 as well as two opposite end portions 8, 9. Between the front side 4 and the back side 5, a plurality of mutually spaced-apart bores or holes 10 extend, each one of which being delimited by an endless limiting wall 11. In some of these bores 10, screws 12 are arranged.

In the embodiment shown, the individual screw 12 consists of a self-drilling screw of the type that in a traditional way includes a shank 13, a head 14 as well as a thread 16 extending backwards from a tip 15, which thread in practice is thin and sharp. In the example, the head 14 is cone-shaped and has a plane end surface 17 in which there is a cruciform seat 18 in which the tool 3 of the drilling screw driver may be applied. It is axiomatic that the head 14 has a larger diameter than the shank 13.

As may be seen in FIG. 1, the magazine may advantageously be made of a number of corrugated boards arranged side by side. A simple corrugated board consists of two outer, plane paper webs between which there is an undulated paper web, the crests of which are agglutinated against the insides of the plane paper webs. Multilayer corrugated boards include two or more undulated paper webs which are internally agglutinated against common, plane paper webs. The shown magazine may either be made of simple corrugated boards which have been interconnected by agglutination or of one or more multilayer corrugated boards. In the case the magazine is made of corrugated board, the limiting walls 11 defining each individual bore 10 consist of a narrow portion of a plane paper web as well as a portion of a wave formation in the undulated paper web. By the fact that the limiting wall consists of comparatively thin paper, the wall becomes resilient and easy to demolish. However, together the various paper webs defining a large number of cavities, constitute a form-stiff and stable framework.

As may be seen in FIG. 2, the individual screw 13 is of a length being somewhat smaller than the height or depth of the magazine. When the screw is applied into the appurtenant bore with the plane surface 17 of the screw head in flush with the front side 4, the tip 15 of the screw will, therefore, be located inside the back side 5 at a certain distance therefrom. Therefore, as long as the screw is stored, the tip will not protrude from the back side. This is something which means that the plane back side 5 may be steadily pressed against a plane surface on the work piece in question. In this state, the head 14 does not protrude from the front side 4. This means that the screws do not risk to get stuck in various objects in the surroundings, e.g. in connection with storage in a clothing pocket or the like.

The individual screw may be applied in the appurtenant bore in various ways. For instance, it is possible to fasten the screw in the bore, the thread 16 partially cutting into the limiting wall 11. When the screw takes its final position in the bore, the upper portion of the limiting wall 11 has been pressed away by the cone-shaped head 14. By the fact that the material of the limiting wall has a certain elasticity, also the pressed-away portion of the limiting wall contributes to hold the screw. Furthermore, the pressing-away of the upper portion of the limiting wall brings about a centring of the rear end of the screw, which in combination with the centring effect of the thread 16 entails that the screw is located mainly exactly perpendicularly to the back side 5, which is to be pressed against the work piece.

It is also feasible to press in the screw axially in the appurtenant bore, the surrounding, resilient wall 11 being possible to apply with an easy press fit against the thread of the screw.

In practice, both the bores housing the screws and the bores being empty may be open at opposite ends, as is shown in the drawings. However, it is also feasible to seal the bores, e.g. by means of a thin plastic film, which covers the back side and/or the front side of the magazine with the purpose of counteracting contamination of the interior of the magazine.

In the embodiment according to FIGS. 1 and 2, a plurality of longitudinal rows of screws 12 are arranged beside each other. More precisely, the magazine includes three longitudinal rows of screws, the screws being arranged in transverse rows of three screws. These transverse rows of screws extend perpendicularly to the long side surfaces of the magazine. On both sides of the longitudinal rows of screws, there are rows of empty bores 10. In an analogous way, there is also at least one empty bore 10 between adjacent screws in one and the same longitudinal row. This means that the individual screw is from all sides surrounded by a number of empty bores in which the comparatively thick screw head 14 may be housed at storage as well as move in connection with the feeding out of the screw from the magazine.

It should be pointed out that the number of screws in the longitudinal rows as well as the transverse rows may vary most considerably.

In a preferred embodiment of the invention, at least one of the two opposite long side surfaces 6, 7 of the magazine is provided with markings 19, which display the axial position of the screws within the magazine. The lateral position of the individual screw has no substantial importance for self-drilling screws by the fact that the screws in that case do not need to meet a pre-drilled hole. On the other hand, it may be important to show the axial position of the screws so that the screw, when being drawn in, will meet a scribed line or the like on the work piece. Advantageously, the markings 19 may consist of lines extending perpendicularly to the back side of the magazine. It is also possible to provide the outside of the magazine with various forms of printing, e.g. advertising printing.

THE FUNCTION AND ADVANTAGES OF THE INVENTION

When the magazine is to be used, it is pressed with the plane back side 5 thereof against the work piece in question. By the fact that this back side is plane, the magazine may in its entirety be held against the work piece in a steady and reliable way. In doing so, the stored screws 12 are fixed in a position where they extend perpendicularly to the pressing surface. When a separate, selected screw is to be fastened in the work piece, the rotatable tool 3 of the drilling screw driver 2 is applied into the screw head seat 18, and then the screw is set in rotation at the same time as it is manually pressed, at least initially, against the work piece. When the screw gets a foothold in the work piece, it is drawn with a large force into the work piece, the screw being fed out of the magazine. In relation to the driving force, the limiting wall 11, which surrounds the screw, exerts no appreciable resistance to feeding out. During the feeding out, the screw head 14 will therefore break down the surrounding limiting wall 11 substantially without resistance, as is clearly shown to the right in FIG. 2.

In this connection, it should be pointed out that conventional so-called bits have a limited length, and therefore they are only suitable for short, stored screws. Within the scope of the invention, the possibility of manufacturing considerably longer bits than the conventional ones is, however, envisaged, more precisely with the purpose of enabling driving of screws from a magazine without the chuck of the screw driver penetrating into the magazine.

A substantial advantage of the screw magazine according to the invention is that the rotatable tool, for instance a "bit", which is used to fasten the screw may be brought to engagement with the screw head in a simple and fast way at the same time as the screw is automatically kept controlled in the desired driving-in direction. In addition, the screws may be stored in a well-arranged and tidy way in the magazine. This means that many screws are quickly and easily accessed for the fastening tool at the same time as all annoying work of applying the individual screws to the fastening tool is eliminated. Furthermore, the magazine may be stored in a smooth way, for instance in clothing pockets.

In FIG. 3, an alternative embodiment of a magazine is shown, which includes only one single longitudinal row of screws 12. Also in this case, the magazine is distinguished by the fact that rows of empty bores 10 are arranged on both sides of a central row of bores in which screws are stored. The limiting walls or paper webs surrounding the central row of bores gives the magazine a width which is considerably larger than the width of only the central row of bores. This means that the back side of the magazine gets a width which is large enough for guaranteeing a firm pressing of the magazine against a work piece in spite of the fact that the magazine only includes one single, comparatively narrow row of screws.

In practice, the magazine according to the invention may have a length within the range of 100–300 mm, and a width within the range of 10–50 mm, the depth of the magazine varying depending on the length of the screws in question.

FEASIBLE MODIFICATIONS OF THE INVENTION

The invention is not solely restricted to the embodiments described and shown in the drawings. Although corrugated board is preferred as a starting material for the production of the screw magazine according to the invention, also other materials may be a possibility. It is, for instance, possible to use a comparatively high-porous board of cellular plastic, in which the holes or bores for receipt of screws are formed. At the same time as the cellular plastic gives the magazine form-stiffness, the material in the individual limiting walls defining the holes is easy to demolish. Also other materials are feasible. Thus, it is only crucial that the screws are mutually spaced-apart a certain distance in the magazine at the same time as the limiting walls of the holes are possible to demolish or give way without substantial resistance in connection with the driving of the screws.

What is claimed is:

1. A screw-magazine having a front-side and a planar back-side in parallel therewith, a plurality of bores extended perpendicularly between said front- and back-sides, some of the bores housing screws of the type that includes a shank with a thread and a head at one end of the shank, said bores forming longitudinal rows arranged side by side, each of said bores being delimited by a respective one of plural endless limiting walls of demolishable nature, said walls interconnecting the longitudinal rows of said bores in a form-stiff, parallelepipedic framework, wherein each of said bores adjacent to said screw-housing bores is an empty one of said bores.

2. The screw-magazine of claim 1, wherein the longitudinal rows are made from boards of corrugated paper agglutinated together into the form-stiff framework.

3. The screw-magazine of claim 1, wherein each said screw-housing bores is on all sides surrounded by the empty bores.

4. The screw-magazine of claim 1, wherein the head of said screws is larger than said bores so that a respective one of the limiting walls is pressed away by the screw's head upon feeding out a screw from the magazine.

5. A screw-magazine, comprising:
   a form-stiff parallelepipedic framework of at least four parallel endless walls that are each connected to adjacent said walls by a respective corrugated wall, said endless and corrugated walls being a deformable material and defining at least three longitudinal rows of bores, said rows being arranged side-by-side, said bores being arranged side-by-side and open at each end; and
   plural screws, each having a head and a threaded shank, in said bores in one of said rows that is between two other ones of said rows, said head being larger than said bores so that said endless and corrugated walls are deformed by said head when said screws are pushed through said bores.

* * * * *